United States Patent [19]
Reiffel

[11] 3,731,995
[45] May 8, 1973

[54] METHOD AND APPARATUS FOR PRODUCING ANIMATED MOTION PICTURES

[75] Inventor: Leonard Reiffel, Chicago, Ill.

[73] Assignee: Instructional Dynamics, Inc., Chicago, Ill.

[22] Filed: Oct. 29, 1970

[21] Appl. No.: 84,964

[52] U.S. Cl. .................. 352/87, 352/50, 352/55
[51] Int. Cl. ........................... G03b 15/00
[58] Field of Search .............. 352/87, 50, 55; 178/19

[56] References Cited

UNITED STATES PATENTS

| | | | |
|---|---|---|---|
| 1,633,547 | 6/1927 | Hurd | 352/87 |
| 3,106,707 | 10/1963 | Thompson | 178/19 X |
| 2,241,544 | 5/1941 | Dreyer, Jr. | 178/19 |
| 3,506,343 | 4/1970 | Dejoux | 352/87 |
| 3,271,097 | 9/1966 | De Montremy et al. | 352/87 |

FOREIGN PATENTS OR APPLICATIONS

| | | | |
|---|---|---|---|
| 1,202,233 | 8/1970 | Great Britain | 352/87 |

Primary Examiner—Samuel S. Matthews
Assistant Examiner—Russell E. Adams, Jr.
Attorney—Siegel and Geren

[57] ABSTRACT

An electrical-optical system for displaying background images, superimposing manually generated animated drawings electronically on such background images, and recording the composite double images on a movie film. The background images initially are reproduced optically or electronically in order to superimpose the animated drawings thereon in exact registration. The background images recorded on the movie film are made by direct optical projection to avoid distortion produced within the electronic system.

9 Claims, 5 Drawing Figures

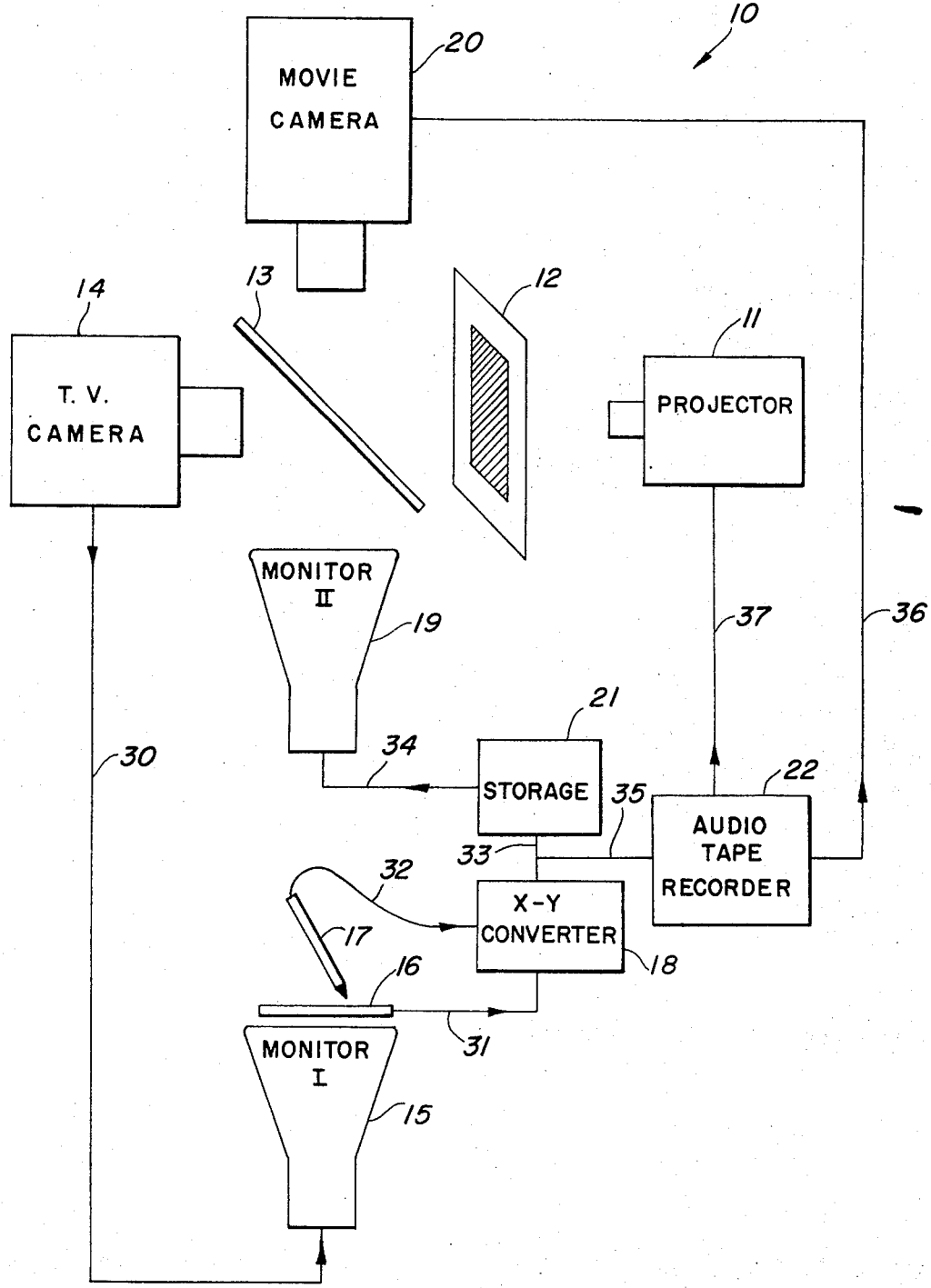

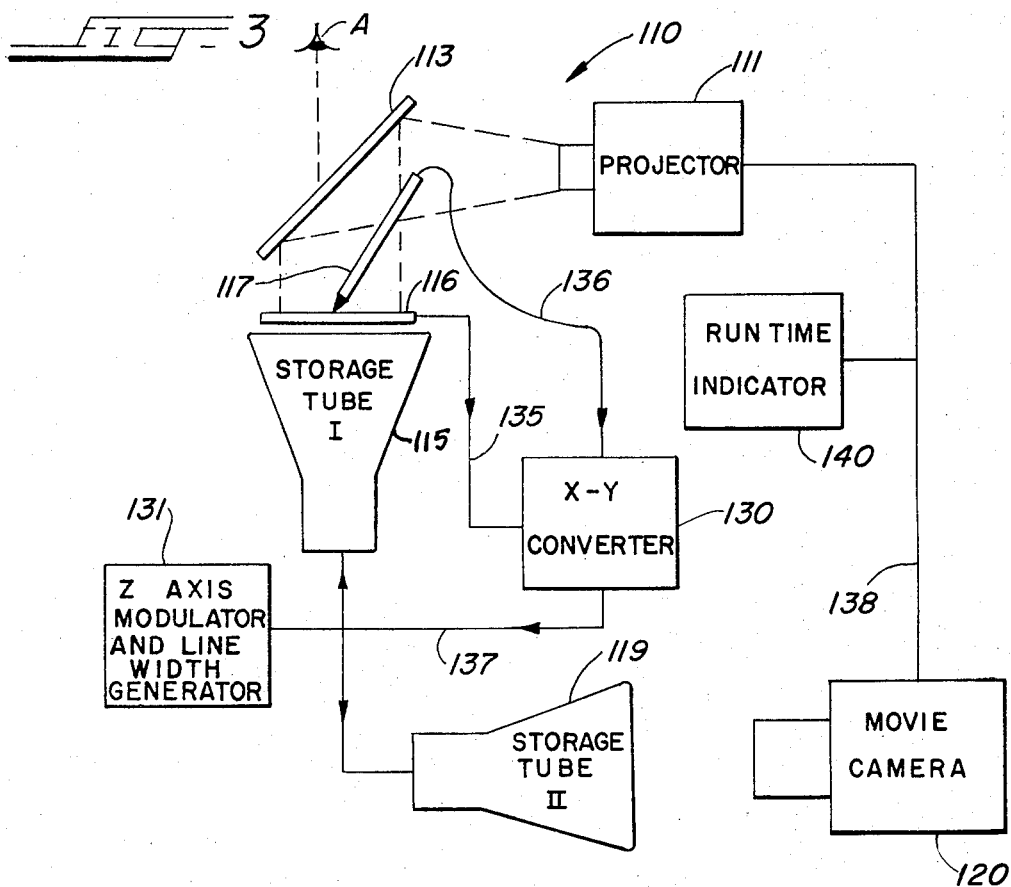
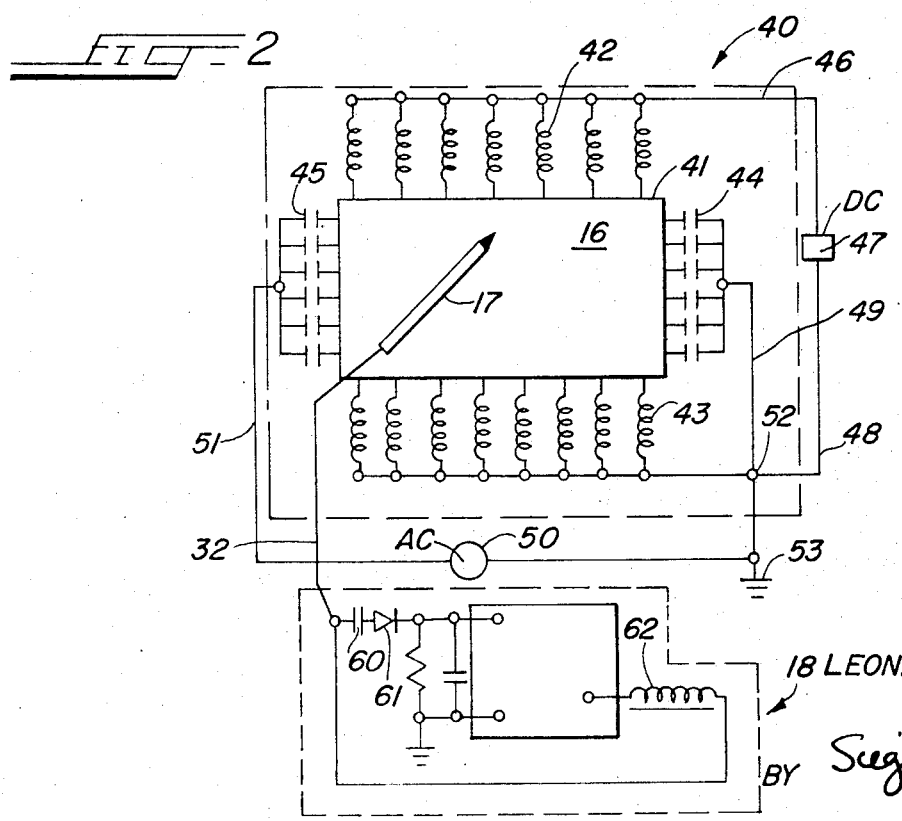

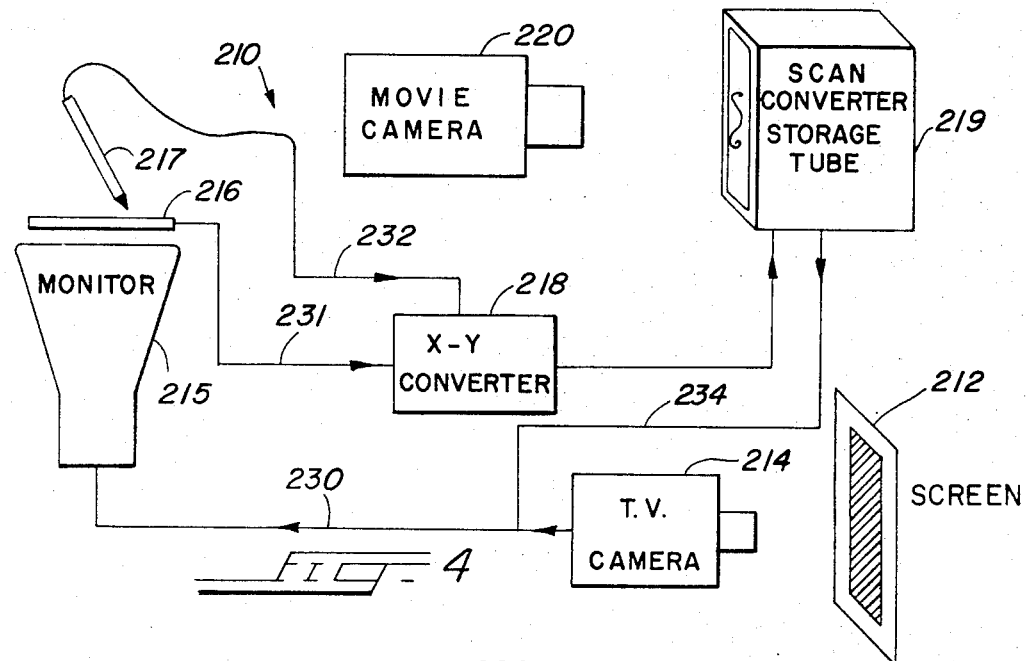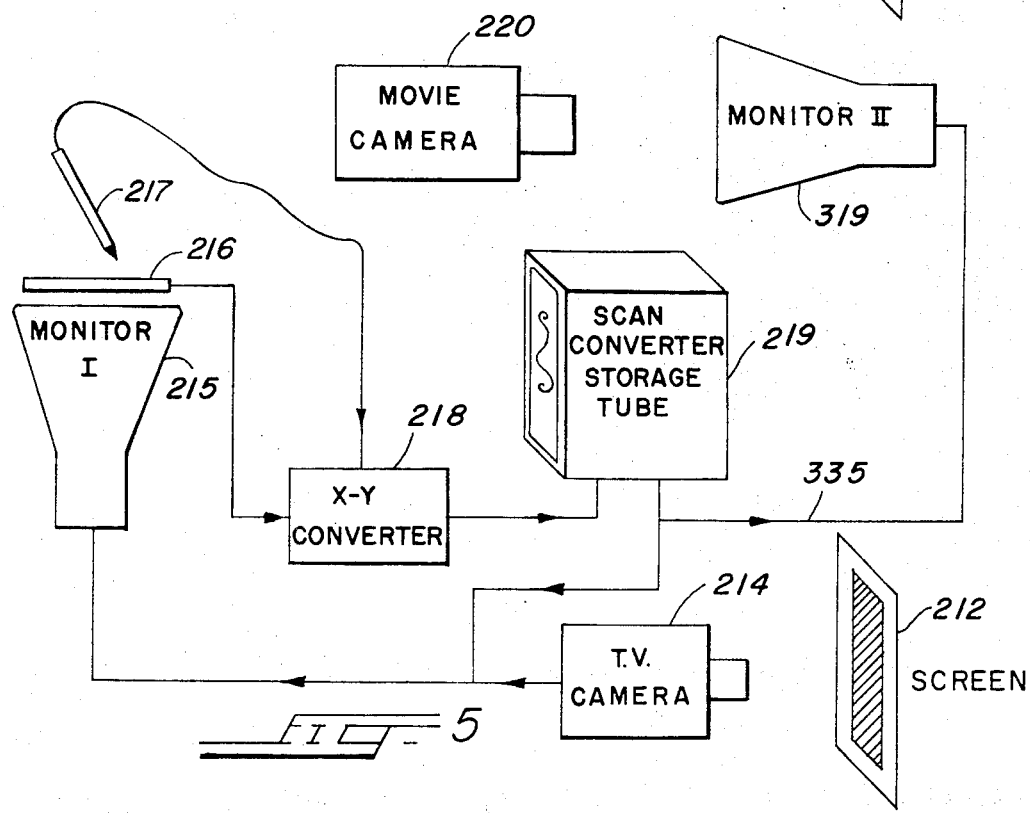

METHOD AND APPARATUS FOR PRODUCING ANIMATED MOTION PICTURES

BACKGROUND OF THE INVENTION

This invention relates to an apparatus for preparing animated movies or images by the use of a novel combination of projecting, recording, and electronic display apparatus.

In co-pending U.S. Pat. application Ser. No. 776,724, now abandoned, there is disclosed an apparatus for electronically generating linear representations on visual display apparatus. Briefly, there is provided a manual display apparatus which includes a coordinate or position sensitive surface and a probe which when interacting create an X-Y signal for each point at which the probe contacts the surface. The X-Y signal is then electronically manipulated and displayed upon the face of the electronic storage display tube. In this manner various linear shapes and designs can be displayed upon the face of the storage tube or on a scan converter tube. If a storage tube is used the generated display is then viewed by a video camera, the output of which is mixed with a scenic background and displayed on a receiver; furthermore, the manual display generator can be a transparent plate which is positioned to over-lie the receiver so that movement of the probe along the plate surface appears to draw a line or create an image in relation to the movement of the probe on the surface and in relation to the scenic background.

U. S. Pat. application Ser. No. 776,724, now abandoned, discloses an apparatus which utilizes the manual display in combination with film-strip-projecting techniques. In that application a manual display generator is used to create the linear images on the surface of the storage tube. A film strip projector is used to project an image onto the surface of the storage tube so that an instructor may illustrate or highlight various features of the projected image.

Animated drawings are normally produced by first preparing a plurality of individual drawings which are successively recorded by a movie camera to create the illusion of movement when projected. Each drawing differs from its prior and succeeding drawing only very slightly. The production of these drawings is very expensive and time consuming and thus the production of the animated motion picture correspondingly expensive and time consuming. Thus, it is clearly desirable to find a different method and apparatus for producing animated motion pictures which are less expensive and less complex to produce.

SUMMARY OF THE INVENTION

There has been invented a novel combination of projection, display and recording apparatus which permits the inexpensive and rapid creation and recording of certain classes of animated motion pictures. The apparatus includes an electronic storage tube or monitor upon the face of which is projected or displayed a visual image. The apparatus also includes a manually actuated display generator overlying the face of the storage or display monitor tube which produces electronic images in precise registration with the visual image. The apparatus may also include a second monitor or storage tube from which the manually generated image is recorded, either by a movie camera or by a video recording device. With such apparatus, an artist can sketch or outline various objects or figures that appear to interact with the projected or display image. The composite images are recorded on a single movie film and when projected appear as an animated motion picture.

BRIEF DESCRIPTION OF THE DRAWINGS

FIG. 1 is a schematic diagram of a complete electrical-optical system for producing animated motion pictures according to the present invention;

FIG. 2 is an electrical diagram of the manually actuated display generator;

FIG. 3 is a schematic diagram of a modification of the system of FIG. 1 in which the visual image is projected directly on the face of the storage tube;

FIG. 4 is another modification in which a TV camera is employed to display the background image on the monitor; and FIG. 5 is yet another modification of FIG. 4 in which a second, high-intensity monitor is employed and from which the manually generated figures are photographed by a movie camera.

DESCRIPTION OF THE PREFERRED EMBODIMENT

Referring to FIG. 1, the overall electrical-optical system may be designated generally by the numeral 10 and comprises a projector 11, a screen 12, a partially-reflecting mirror 13, a TV camera 14, a first monitor 15, a potentiometric plate 16 and probe 17, and X-Y data converter 18, a second storage tube or monitor 19, and a movie camera 20.

The projector 11 may be a slide, strip-film, or movie projector triggered to display one frame at a time. The image projected by the projector 11 is cast upon the screen 12 which may be of the translucent type or may be direct lighted depending upon the orientation of the projector 11 with respect to the screen 12. The scene projected upon the screen 12 constitutes the background image for preparation of the animated film. This scene is observed by the TV camera 14 through the partially-reflecting mirror 13 and the camera 14 transmits a video signal over a conduit 30 to the monitor 15 which reproduces the scene on its face.

The potentiometric plate 16 is transparent and is disposed directly on top of the face of the monitor 15 and provides a frame of reference for the production of animated images with respect to the background image on the monitor 15. The animated images are drawn on the plate 16 by an artist using the probe 17. When the probe 17 touches the plate 16, electrical signals representative of the X-Y position of the point of contact at any instant are fed over conduits 31 and 32 to the X-Y converter 18. The converter 18 transmits electrical information over conduit 33 to the storage device 21 which in turn transmits information over conduit 34 to monitor 19 where it is reproduced as a visual image. The storage device 21 compiles the complete drawing prepared by the artist on the plate 16 as it is being drawn and thereafter and displays all that he had done on the monitor 19. The image appearing on the face of monitor 19 is reflected off the mirror 13 and observed by the TV camera 14. The camera 14 then transmits the composite image of the background scene and animated drawing back to monitor 15 so that the artist can observe the superimposed images. He can easily alter or erase his drawing on the plate 16 as required before the composite picture is recorded by the movie camera 20. A more complete description of the plate and probe 17 will be given hereinafter with reference to FIG. 2.

The X-Y converter 18 may also be connected by means of a conduit 35 to an audio tape recorder 22. This recorder 22 may record the information supplied to the storage device 21 and also may be preprogrammed to actuate the movie camera 20 over conduit 36 and keyed to advance the next frame of the projector 11 over the conduit 37. Thus, the artist can record his entire drawing sequence on the audio tape and preview it prior to actuating camera 20 or he can use as much of a prior drawing as he wishes for preparing the next drawing.

It should be noted that the image of the drawing appearing on the face of the monitor 19 is reversed when reflected from the mirror 13 into the TV camera 14. This requires that the image appearing on the monitor 19 be reversed when portrayed so that it appears in the correct orientation on the monitor 15. Since the movie camera 20 sees the image on the monitor 19 directly through the mirror 13, it might appear that the camera 20 will record the reversed image. However, it should also be noted that the image from the projector 11 appearing on the screen 12 is also reversed when it is reflected off the mirror 13. Therefore, the two images as superimposed are recorded by the movie camera 20 in the proper orientation.

It should also be noted that the movie camera 20 records the direct optical projection of the background scene. This means that the composite movie film will retain the same high quality as that appearing on the film in the projector 11. The animated drawings superimposed on the background scenes will show the raster of the TV display, but this is not considered to be critical for the line drawings.

The movie camera 20 may be manipulated independently as desired to produce Zoom pictures or close-ups, or turning effects, for example. This is facilitated by arranging for TV camera 14 to view the scene 12 through the same lens as is used by camera 20. This can be most easily accomplished by coupling camera 14 to the viewfinder of camera 20 and using a movie camera of the thru-the-lens viewfinder type.

If desired, the projector 11, screen 12, mirror 13, TV camera 14, monitor 19 and movie camera 20 as a group may be kept at some remote location and/or in a light-tight box.

Referring now to FIG. 2, the manually actuated display generator will now be described in more detail. This device has been described in the earlier identified applications and the description offered here is only to enable one skilled in the art to understand the complete invention. It should be understood that a number of comparable devices might be employed to generate the X-Y coordinates of any point on the drawing.

The generator as a whole may be designated by the numeral 40 and includes the plate 16 and probe 17. The plate 16 is preferably a transparent glass plate and carries a conductive top surface coating 41 of tin oxide or resistance wire mesh. A plurality of choke coils 42 and 43 are disposed equally spaced along the upper and lower edges, respectively, of the plate 16 and are electrically connected to the conductive coating 41. Similarly, a plurality of capacitors 44 and 45 are disposed equally spaced along the right and left hand edges, respectively, of the plate 16 and are also connected to the conductive coating 41. The coils 42 are connected in parallel by a conductor 46 to one side of a DC source 47, and the coils 43 are connected in parallel by a conductor 48 to the other side of the DC source 47. The capacitors 44 are connected in parallel by a conductor 49 to one side of an AC source 50, and the capacitors 45 are connected in parallel by a conductor 51 to the other side of the AC source 50. The conductors 48 and 49 are connected at 52 to a common ground 53.

The DC source 47 establishes a DC potential gradient across the conductive coating 41 between the upper and lower edges of the plate 16. Similarly, the AC source 50 establishes an AC potential gradient across the conductive coating 41 between the right and left hand edges of the plate 16. The inductive reactance of the coils 42 and 43 effectively block any AC potential from reaching the DC source 47. Similarly, the capacitors 44 and 45 act as open circuits to the entry of DC. Using a plurality of equally spaced coils and capacitors along the edges ensures that the equipotential lines in the fields are rectilinear and that an accurate X-Y position can be established for every point on the surface of the plate 16. With the conductors 48 and 49 connected to ground as described, the lower right hand corner of the plate 16 becomes a point of origin for measurement of the X-Y coordinates.

The probe 17 acts as a pick-up when it contacts the conductive coating 41 and sends a mixed AC - DC signal over conduit 32 to the X-Y data converter 18. The converter 18 may include as one input connection a capacitor 60 and diode 61. The capacitor 60 blocks the DC component of the signal but passes the AC component. The diode 61 rectifies the AC signal. The converter 18 may include as a second input connection a chock coil 62. The coil 62 acts as a high impedance to the entry of any AC signal but readily passes the DC component. The converter 18 transforms the signals received into the proper electrical form for retention by the storage device 21 and for driving the monitor 19 as well as tape recorder 22.

The act of manually drawing on the face of the plate 16 with the probe 17 thereby produces the electrical signals necessary to reproduce what is drawn on the monitor 19 so as to be photographed by the movie camera 20. The superposition of the plate 16 directly on top of the face of the monitor 19 insures exact registration of the drawn image with respect to the background image displayed on the monitor 15.

Referring now to FIG. 3, there is illustrated a modification of the system of FIG. 1 for producing animated motion pictures. This overall system may be designated by the numeral 110 and comprises a projector 111, a half-silvered or one-way mirror 113, a first storage tube 115, a potentiometric plate 116 and probe 117, a second storage tube 119, and a movie camera 120. In addition, the system 110 includes an X-Y converter 130, a Z axis modulator 131, and a run time indicator 140.

The projector 111 casts an image on the half-silvered mirror 113 which reflects this image so as to be in focus on the surface of the plate 116. An artist, represented by the eye at A, can observe the image on the face of the plate 116 through the mirror 113. This image constitutes the background view for the animated film to be prepared. The artist then proceeds to draw the animated figures on the plate 116 with the probe 117. The plate 116 and probe 117 function as previously described to provide X-Y electrical signals over conduits 135 and 136 to the X-Y converter 130. The converter 130 transforms the information received and transmits signals over conduit 137 to the storage tube 115. The storage tube 115 reproduces the image as drawn by the artist and it appears subposed directly beneath the plate 116 in precise registration with the image as drawn. To the artist or other observer, the image appears as if it had been drawn by a crayon or marking pen. The artist is at liberty to erase or edit all or as much of the image as he deems necessary until he is satisfied with its appearance.

It is possible to embellish the drawings that appear on the storage tube 115 with dots, dashes, circles, different line-widths, etc. Such function is performed by the Z axis modulator and line width generator 131 which is connected to the conduit 137 leading to the storage tubes 115 and 119. When dots or dashes are desired, the Z axis modulator simply switches the electron beams in the storage tubes on and off for appropriate intervals. When different line widths or circles are desired, generator 131 merely adds rapidly varying sine wave voltages 90° out of phase with each other and of appropriate amplitude to the X and Y position signals supplied by the X-Y converter 130.

The image drawn on the plate 116 and appearing on the storage tube 115 also is reproduced on the storage tube 119 where it is photographed by the movie camera 120. The run time indicator 140 is connected to the projector 111 and movie camera 120 by conduit 138. This indicator 140 records the time or number of frames of film in camera 120 consumed in recording the artist's drawings over each background image. The camera 120 initially photographs only the drawn image. At some later time, the camera 120 can also record the background scenes as displayed by the projector 111 by double exposure of the film. The run-time indicator 140 is keyed to the camera 120 to ensure that the proper time-wise super-imposition of drawn images on the background views occurs. Once again an audio tape recorder can be used to record the data flowing to the storage tubes so the operator can preview the entire sequence prior to turning on Camera 120 and actually exposing costly film.

Referring now to FIG. 4, there is illustrated a simplified system for the production of animated movie films. This system may be designated by the numeral 210 and comprises a screen 212, TV camera 214, monitor 215, potentiometric plate 216 and probe 217, X-Y converter 218, storage tube 219, and movie camera 220.

The TV camera 214 detects a background view appearing on the screen 212 and transmits a video signal over conduit 230 to the monitor 215 where this view is reproduced. The artist prepares the drawn images with respect to this background view using probe 217 and plate 216, as previously described. Electrical signals corresponding the the X-Y position of the probe 217 on the plate 216 are transmitted over conduits 231 and 232 to the X-Y converter 218. The converter 218 retransmits signals to the storage tube 219 where the drawn image is reproduced and photographed by the movie camera 220. The storage tube 219 is of the scan converter type and it also transmits a video signal over conduit 234 to the monitor 215 where the drawn image appears superimposed on the background view. Subsequently, the movie camera 220 double exposes the film to record the background scenes appearing on the screen 212. As previously, the X-Y signals driving the scan converter can be recorded in advance of exposing any film by connecting an audio recorder into the system between elements 218 and 219.

The system appearing in FIG. 5 is still another modification of the system shown in FIG. 4. This system has the additional feature of including a high contrast, high brightness monitor tube 319 on which the drawn image is reproduced, either in color or in black and white. The signals to display the image are provided by the scan converter storage tube 219 over conduit 335. The movie camera 220 records the image appearing on the high contrast tube 319. For this purpose, the camera 220 and monitor 319 may be kept at a remote location or in a light sealed box or room.

It should be understood that, in all of the embodiments described above, it is possible to substitute a video camera for the movie camera and record the superimposed images on video tape. Similarly, the background scenes can be provided by any video system as well as from an optical projector. They may also be Line scenes.

It will be appreciated that various modifications and changes can be made to the embodiments shown herein without departing from the spirit and scope of the invention. The invention should not be considered as limited to such embodiments except insofar as the claims may be so limited.

I claim as my invention:

1. A system for producing animated motion pictures comprising:
    a. means for providing a series of background images;
    b. display means for viewing said background images;
    c. means for generating a series of electrical signals representative of a drawing;
    d. means to convert said electrical signals to a visual display on said display means for viewing said background image which visual display is viewable by the operator in registration with the background image;
    e. means for forming composite images of said electrical signal generated visual display and said background images; and
    f. means to record in optical form said composite images.

2. The system of claim 1 wherein said means for generating said series of electrical signals comprises a visually transparent potentiometric plate and a probe member coacting therewith for drawing thereon whereby electrical signals representative of the coordinates of the position of plate-probe interaction are generated.

3. The system of claim 2 and including electrical image reproduction means positioned directly underneath said potentiometric plate said reproduction means being operable for reproducing a visual image from said electrical signals.

4. The system of claim 2 and including tape recording/playback means adapted to record/playback said series of electrical signals.

5. The system of claim 3 including a second display means being operable for reproducing a visual image from said electrical signals and being positioned whereby said visual images presented thereon are photographable by a motion picture camera.

6. The system of claim 1 wherein said optical means to record said composite image is a motion picture camera.

7. The system of claim 6 including a motion picture projector and an electrical run-time indicator interconnecting said projector and said motion picture camera to control the double exposure of the background images in correct registration with the drawings photographed by said motion picture camera.

8. The system of claim 2 wherein said means for forming composite images of said visual display and said background images includes a partially reflecting mirror for reflecting said background images onto said potentiometric plate whereby the operator is able to view composite images through said mirror.

9. A system for producing animated motion pictures comprising:
  a. means for providing a series of background images;
  b. display means for viewing said background images;
  c. means for generating a series of electrical signals representative of a drawing;
  d. means to convert said electrical signals to a visual display on said display means for viewing said background image which visual display is viewable by the operator in registration with the background image;
  e. means to optically record the visual display resulting from said electrical signals and to photographically combine said visual display with said background images.

* * * * *